United States Patent
Tzirkel-Hancock et al.

(10) Patent No.: US 10,311,854 B2
(45) Date of Patent: Jun. 4, 2019

(54) NOISE CANCELLATION SYSTEM FOR A VEHICLE

(71) Applicant: GM Global Technology Operations LLC, Detroit, MI (US)

(72) Inventors: Eli Tzirkel-Hancock, Ra'Anana (IL); Ilan Malka, Tel Aviv (IL); Bassam S. Shahmurad, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 15/664,654

(22) Filed: Jul. 31, 2017

(65) Prior Publication Data

US 2019/0035379 A1 Jan. 31, 2019

(51) Int. Cl.
| | |
|---|---|
| *G06K 9/00* | (2006.01) |
| *G06K 9/20* | (2006.01) |
| *G06K 9/78* | (2006.01) |
| *G10K 11/178* | (2006.01) |

(52) U.S. Cl.
CPC ........ *G10K 11/178* (2013.01); *G06K 9/00791* (2013.01); *G06K 9/209* (2013.01); *G06K 9/78* (2013.01); *G10K 2210/12821* (2013.01); *G10K 2210/3044* (2013.01); *G10K 2210/501* (2013.01)

(58) Field of Classification Search
CPC .. B60G 17/016; B60G 17/019; B60G 17/015; B60G 15/10; B60G 2202/413; B60G 2204/11; B60G 2600/182; B60G 2800/162; B60G 17/01933; B60G 2400/821; B60G 2400/204; B60G 2400/10; G10K 11/178; G10K 2210/12821; G10K 2210/1282; G10K 11/17855; G10K 2210/128; G10K 11/002; G10K 2210/501; H04R 3/04
USPC ...... 701/47, 70; 381/71.4, 71.1, 71.11, 71.8, 381/86, 94.1
See application file for complete search history.

(56) References Cited

U.S. PATENT DOCUMENTS

2014/0303905 A1* 10/2014 Jo .................. G01H 1/00
　　　　　　　　　　　　　　　　　702/33
2018/0164119 A1* 6/2018 Becker .............. G01C 21/3691

* cited by examiner

*Primary Examiner* — Yogeshkumar Patel
(74) *Attorney, Agent, or Firm* — Cantor Colburn LLP

(57) ABSTRACT

A noise cancellation system for a vehicle includes a sensor configured to determine an imminent noise that will be perceivable in a passenger compartment of the vehicle, a noise identification module operable to identify at least one quality of the imminent noise, and a noise cancellation device operable to substantially attenuate the imminent noise as the imminent noise becomes a perceivable noise in the passenger compartment based on the at least one quality of the imminent noise.

20 Claims, 3 Drawing Sheets

NOISE CANCELLATION SYSTEM FOR A VEHICLE

INTRODUCTION

The subject disclosure relates to the art of vehicles and, more particularly, to a noise cancellation system for a vehicle.

Vehicles traveling along roadways are subject to transient noises caused by an interaction with, for example, irregularities in road surface. Noise generated by interactions with road surface irregularities may interfere with a riding experience in a vehicle. In order to mitigate undesirable noise, many vehicle include noise suppression or cancellation systems. Currently, noise mitigation systems are reactive in nature. That is, a sound is perceived by a microphone mounted in the vehicle. The noise is analyzed and an attenuation action is taken.

The time from detecting to attenuating the sound introduces a latency into the mitigation system. This latency allows a portion of the noise to enter vehicle spaces. The portion of the noise entering vehicle spaces could interfere with passenger interactions or interactions with vehicle systems such as navigation systems. Accordingly, it is desirable to provide for a noise cancellation system that proactively detects noise prior to the noise reaching occupant spaces of the vehicle.

SUMMARY

In accordance with an aspect of an exemplary embodiment, a noise cancellation system for a vehicle includes a sensor configured to determine an imminent noise that will be perceivable in a passenger compartment of the vehicle, a noise identification module operable to identify at least one quality of the imminent noise, and a noise cancellation device operable to substantially attenuate the imminent noise as the imminent noise becomes a perceivable noise in the passenger compartment based on the at least one quality of the imminent noise.

In addition to one or more of the features described above or below, or as an alternative, further embodiments could include wherein the sensor comprises a camera.

In addition to one or more of the features described above or below, or as an alternative, further embodiments could include wherein the camera is mounted at a forward portion of the vehicle.

In addition to one or more of the features described above or below, or as an alternative, further embodiments could include wherein the forward portion of the vehicle comprises a front body feature of the vehicle.

In addition to one or more of the features described above or below, or as an alternative, further embodiments could include wherein the front body feature comprises a front bumper.

In addition to one or more of the features described above or below, or as an alternative, further embodiments could include wherein the sensor comprises an accelerometer.

In addition to one or more of the features described above or below, or as an alternative, further embodiments could include wherein the accelerometer is mounted to a forward suspension component of the vehicle.

In addition to one or more of the features described above or below, or as an alternative, further embodiments could include wherein the accelerometer is mounted to a forward drive component of the vehicle.

In accordance with another aspect of an exemplary embodiment, a vehicle includes a body having a forward body feature, a forward suspension component, a forward drive component, a passenger compartment, and a noise cancellation system including a sensor configured to detect an imminent noise that will be perceivable in a passenger compartment of the vehicle, a noise identification module operable to identify at least one quality of the imminent noise, and a noise cancellation device operable to substantially attenuate the imminent noise as the imminent noise becomes a perceivable noise in the passenger compartment based on the at least one quality of the imminent noise.

In addition to one or more of the features described above or below, or as an alternative, further embodiments could include wherein the sensor comprises a camera.

In addition to one or more of the features described above or below, or as an alternative, further embodiments could include wherein the camera is mounted at a forward portion of the vehicle.

In addition to one or more of the features described above or below, or as an alternative, further embodiments could include wherein the forward portion of the vehicle comprises a front body feature of the vehicle.

In addition to one or more of the features described above or below, or as an alternative, further embodiments could include wherein the front body feature comprises a front bumper.

In addition to one or more of the features described above or below, or as an alternative, further embodiments could include wherein the sensor comprises an accelerometer.

In addition to one or more of the features described above or below, or as an alternative, further embodiments could include wherein the accelerometer is mounted to one of a forward suspension component and a forward drive component of the vehicle.

In addition to one or more of the features described above or below, or as an alternative, further embodiments could include an internal communication system, the noise cancellation system attenuating the perceivable noise to enhance sound quality for the internal communication system.

In accordance with yet another aspect of an exemplary embodiment, a computer program product for cancelling noise produced between a vehicle and a road surface includes a non-transitory computer readable storage medium having program instructions embodied therewith, the program instructions are executable by a computer processor to cause the computer processor to, detect an imminent noise, identify the imminent noise, determine an abatement strategy, and generate a cancellation frequency that substantially suppresses the imminent noise as the imminent noise becomes a perceivable noise in the passenger compartment.

In addition to one or more of the features described above or below, or as an alternative, further embodiments could include wherein the program instructions cause the computer processor to identify the imminent noise by receiving signals produced by an accelerometer.

In addition to one or more of the features described above or below, or as an alternative, further embodiments could include wherein the program instructions cause the computer processor to identify the imminent noise by receiving signals produced by the accelerometer at one of a forward drive component and a forward suspension component of the vehicle.

In addition to one or more of the features described above or below, or as an alternative, further embodiments could include wherein the program instructions cause the computer processor to identify the imminent noise by receiving image data of the road surface through a camera.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
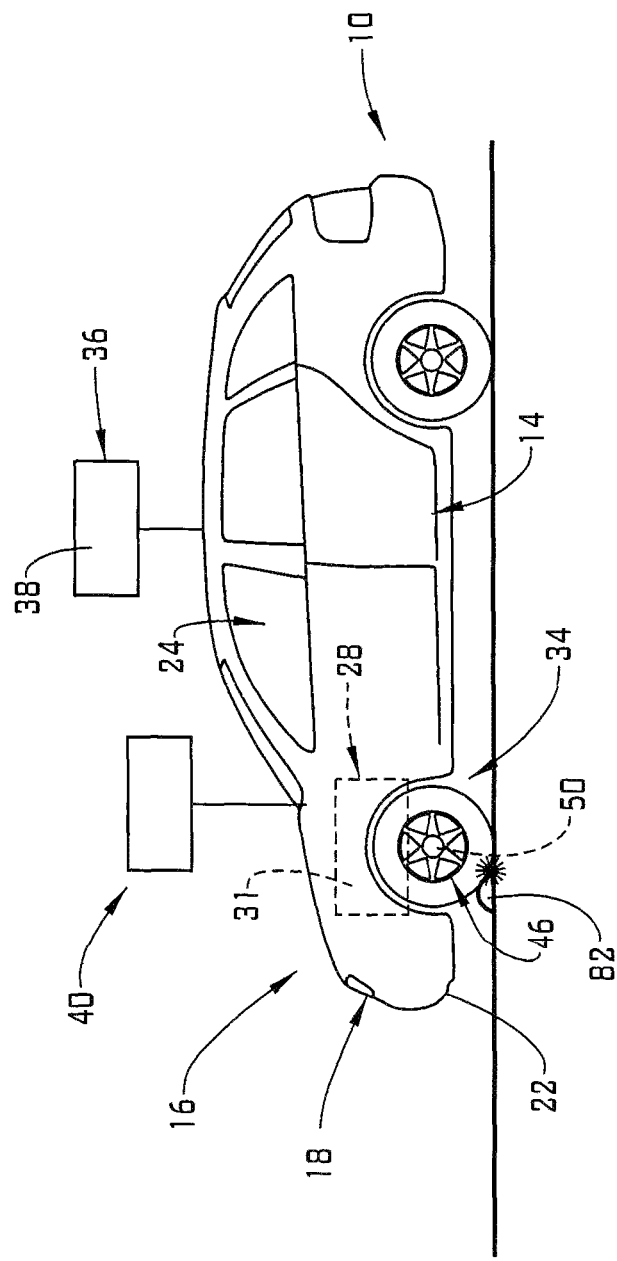
FIG. 1 depicts a motor vehicle including a noise cancellation system, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an exemplary embodiment, is illustrated generally at 10 in FIG. 1. Vehicle 10 includes a body 14 having a forward portion 16 including a front body feature 18. In an exemplary aspect, front body feature 18 may define a front bumper 22. It should be understood that front body feature 18 may define other vehicle components such as fairings, fenders, grills and the like. Body 14 may also define, at least in part, an occupant compartment 24. Vehicle 10 may also include a forward drive component 28 that may be defined by one or more of a prime mover component and a transmission component, indicated at 31.

Vehicle 10 may also include a front suspension component 34 that may take on a variety of forms including steering components, shock absorbing components, linkages and the like. Further, vehicle 10 may also include an internal communication system 36, which may take the form of an intercom system 38. Intercom system 38 promotes two-way communication between occupants in forward portions of vehicle 10 and in rear portions of vehicle 10.

In accordance with an exemplary aspect, vehicle 10 includes a proactive noise cancellation system 40. The term "proactive" should be understood to describe a system that may sense, identify and cancel a noise before that noise reaches occupant areas of the vehicle. The noise may be imminent or perceived only at forward portions of the vehicle as will be detailed herein. In accordance with an exemplary aspect, vehicle 10 may include a sensor 46 mounted at the forward portion 16 of body 14. Sensor 46 in accordance with one exemplary aspect, may take the form of an accelerometer 50 mounted at one of forward drive component 28 and forward suspension component 34.

Figure 2:
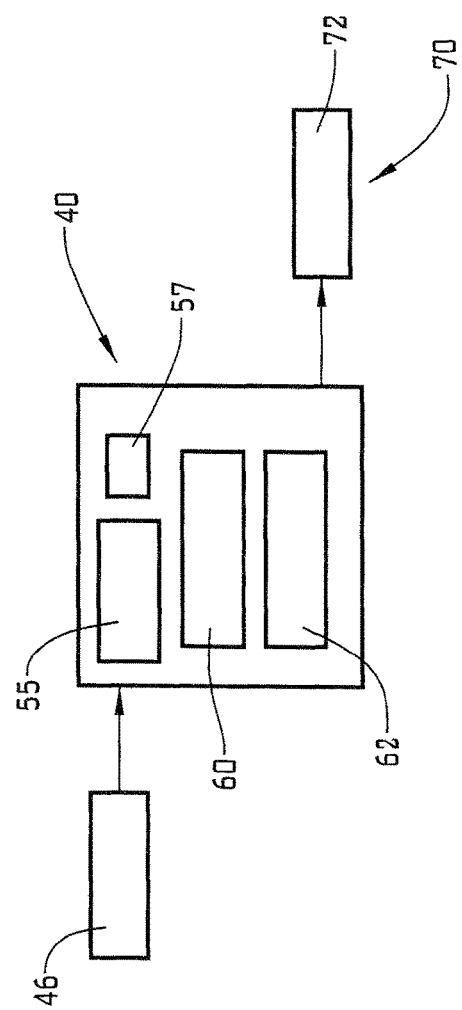
FIG. 2 depicts the noise cancellation system of FIG. 1, in accordance with an aspect of an exemplary embodiment.

Reference will now follow to FIG. 2, with continued reference to FIG. 1, in describing proactive noise cancellation system 40 in accordance with an exemplary aspect. Proactive noise cancellation system 40 includes a central processor unit (CPU) 55 operatively connected to a non-volatile memory 57 that may store a set of program instructions. Proactive noise cancellation system 40 also includes a noise identification module 60 and an abatement processing module 62.

In accordance with an exemplary aspect, sensor 46 may detect an imminent noise such as caused by an interaction between vehicle 10 and a road surface at forward portion 16. The term "imminent noise" should be understood to describe a noise that has been sensed or will be sensed prior to that noise reaching occupant portions of vehicle 10. Further, as discussed herein, sensor 46 detects objects or road irregularities 82 that may create an imminent noise. Thus, the phrase "detecting an imminent noise" should be understood to mean that sensor 46 detects a physical change in a road surface that is more likely than not to lead to a noise perceivable in occupant compartment 24. In the exemplary embodiment shown, the imminent noise may be detected by accelerometer 50. The imminent noise, once perceived at forward portion 16, is designated as a perceivable noise and is passed to proactive noise cancellation module 40 and evaluated by noise identification module 60.

After evaluating the imminent and/or perceivable noise, attenuation processing module 62 may determine, based on program instructions stored in non-volatile memory 57, an abatement strategy that could include an attenuation frequency that may be emitted by a noise cancellation device 70 which, may take the form of a speaker 72 mounted in occupant compartment 24. By detecting the imminent noise and identifying the perceivable noise at forward portion 16, noise cancellation latency, present in other cancellation systems, may be substantially eliminated. That is, noise cancellation system, 40 identifies and cancels the perceivable noise before the noise reaches occupant compartment 24. In this manner, noise cancellation system enhances sound quality or conversation clarity for internal communication system 36 and/or interactions between occupants and a vehicle interface system that relies upon voice commands.

Figure 3:
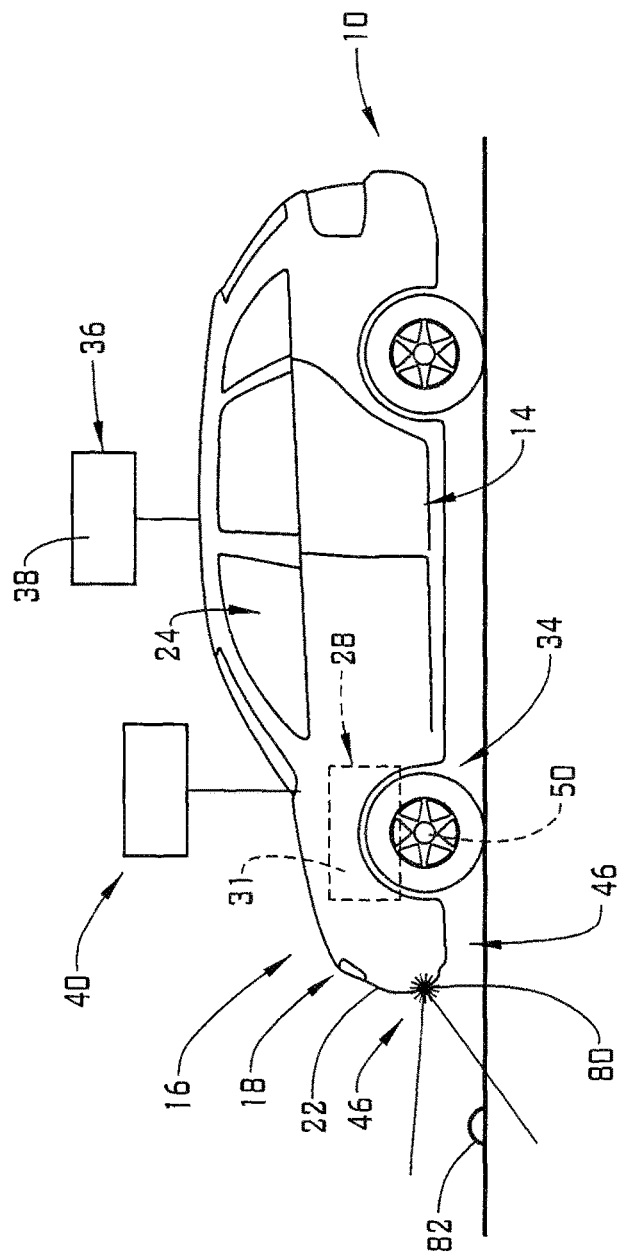
FIG. 3 depicts a motor vehicle including a noise cancellation system, in accordance with another aspect of an exemplary embodiment.

In accordance with another aspect of an exemplary embodiment illustrated in FIG. 3, sensor 46 may take the form of a camera 80 mounted at forward portion 16. Camera 80 may be mounted at or near front bumper 22 and positioned to view a portion of a road surface in front of vehicle 10. Camera 80 may detect changes in a road surface in front of vehicle 10 that may produce a noise. The changes in road surface may take the form of pot holes, surface damage, a speed bump such as shown at 82 and the like. Noise identification module 60 determines a type of imminent noise that may be produced so that abatement processing module 62 may determine a desired cancellation strategy as instructed by program instructions in non-volatile memory 57 once a perceivable noise has been identified. The abatement strategy may include producing a sound at a selected frequency through speaker 72.

The terms "about" and "substantially" are intended to include the degree of error associated with measurement of the particular quantity based upon the equipment available at the time of filing the application. For example, "about" and "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A noise cancelation system for a vehicle comprising:
   a sensor configured to determine an imminent noise before being perceivable in a passenger compartment of the vehicle;
   a noise identification module operable to identify at least one quality of the imminent noise; and
   a noise cancellation device operable to substantially attenuate the imminent noise as the imminent noise becomes a perceivable noise in the passenger compartment based on the at least one quality of the imminent noise.

2. The noise cancellation system according to claim 1, wherein the sensor comprises a camera.

3. The noise cancellation system according to claim 2, wherein the camera is mounted at a forward portion of the vehicle.

4. The noise cancellation system according to claim 3, wherein the forward portion of the vehicle comprises a front body feature of the vehicle.

5. The noise cancellation system according to claim 4, wherein the front body feature comprises a front bumper.

6. The noise cancellation system according to claim 1, wherein the sensor comprises an accelerometer.

7. The noise cancellation system according to claim 6, wherein the accelerometer is mounted to a forward suspension component of the vehicle.

8. The noise cancellation system according to claim 6, wherein the accelerometer is mounted to a forward drive component of the vehicle.

9. A vehicle comprising:
   a body including a forward body feature;
   a forward suspension component;
   a forward drive component;
   a passenger compartment; and
   a noise cancellation system comprising:
      a sensor configured to detect an imminent noise before being perceivable in a passenger compartment of the vehicle;
      a noise identification module operable to identify at least one quality of the imminent noise; and
      a noise cancellation device operable to substantially attenuate the imminent noise as the imminent noise becomes a perceivable noise in the passenger compartment based on the at least one quality of the imminent noise.

10. The vehicle according to claim 9, wherein the sensor comprises a camera.

11. The vehicle according to claim 10, wherein the camera is mounted at a forward portion of the vehicle.

12. The vehicle according to claim 11, wherein the forward portion of the vehicle comprises a front body feature of the vehicle.

13. The vehicle according to claim 12, wherein the front body feature comprises a front bumper.

14. The vehicle according to claim 9, wherein the sensor comprises an accelerometer.

15. The vehicle according to claim 14, wherein the accelerometer is mounted to one of a forward suspension component and a forward drive component of the vehicle.

16. The vehicle according to claim 9, further comprising: an internal communication system, the noise cancellation system attenuating the perceivable noise to enhance sound quality for the internal communication system.

17. A computer program product for cancelling noise produced between a vehicle and a road surface, the computer program product comprising a non-transitory computer readable storage medium having program instructions embodied therewith, the program instructions being executable by a computer processor to cause the computer processor to:
   detect an imminent noise before the noise is perceivable in the vehicle;
   identify the imminent noise;
   determine an abatement strategy; and
   generate a cancellation frequency that substantially suppresses the imminent noise as the imminent noise becomes a perceivable noise in a passenger compartment.

18. The computer program product of claim 17, wherein the program instructions cause the computer processor to identify the imminent noise by receiving signals produced by an accelerometer.

19. The computer program product of claim 18, wherein the program instructions cause the computer processor to identify the imminent noise by receiving signals produced by the accelerometer at one of a forward drive component and a forward suspension component of the vehicle.

20. The computer program product of claim 17, wherein the program instructions cause the computer processor to identify the imminent noise by receiving image data of the road surface through a camera.

* * * * *